United States Patent
Lee

(10) Patent No.: US 8,248,469 B2
(45) Date of Patent: Aug. 21, 2012

(54) SURVEILLANCE SYSTEM AND SURVEILLANCE METHOD THEREOF

(75) Inventor: Shiao-Wei Lee, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 758 days.

(21) Appl. No.: 12/406,923

(22) Filed: Mar. 18, 2009

(65) Prior Publication Data
US 2010/0033568 A1 Feb. 11, 2010

(30) Foreign Application Priority Data

Aug. 8, 2008 (CN) .......................... 2008 1 0303630

(51) Int. Cl.
H04N 7/18 (2006.01)

(52) U.S. Cl. .......................... 348/143; 382/103; 382/107

(58) Field of Classification Search .................. 348/143; 382/103, 107
See application file for complete search history.

(56) References Cited

U.S. PATENT DOCUMENTS

| 7,236,266 | B2 * | 6/2007 | Fuchigami | 358/1.9 |
| 2003/0044049 | A1 * | 3/2003 | Burgi et al. | 382/107 |
| 2005/0212950 | A1 * | 9/2005 | Kanai | 348/345 |
| 2007/0058837 | A1 * | 3/2007 | Boregowda et al. | 382/103 |
| 2007/0133840 | A1 * | 6/2007 | Cilia | 382/103 |
| 2009/0154824 | A1 * | 6/2009 | Rai | 382/260 |
| 2009/0214129 | A1 * | 8/2009 | Quan | 382/260 |

FOREIGN PATENT DOCUMENTS

TW I258312 7/2006

* cited by examiner

*Primary Examiner* — Firmin Backer
*Assistant Examiner* — Jonathan Bui
(74) *Attorney, Agent, or Firm* — Altis Law Group, Inc.

(57) ABSTRACT

A method for surveillance is disclosed. Firstly, video of an area is captured. The video includes a first image and a second. Each image is subdivided into a number of subdivisions. A contrast value matrix is then calculated for each image by calculating a contrast value for each subdivision. A compared value matrix of the second image is calculated by comparing each element of the contrast value matrix associated with the current image with a corresponding element of the contrast value matrix associated with the prior image. Next, the compared value matrix is weighted using a preset weight matrix to locate the movement in the second image. Finally, the aim of capturing is adjusted based upon the location of movement.

7 Claims, 3 Drawing Sheets

SURVEILLANCE SYSTEM AND SURVEILLANCE METHOD THEREOF

BACKGROUND

1. Technical Field

The present disclosure relates to surveillance systems and, particularly, to a surveillance system capable of automatically tracking a moving object and a surveillance method thereof.

2. Description of the Related Art

Current surveillance systems typically require manual adjustments to track moving object(s). This is inconvenient.

Therefore, it is desirable to provide a surveillance system and a surveillance method thereof, which can overcome the above-mentioned problem.

DETAILED DESCRIPTION OF THE EMBODIMENTS

Figure 1:
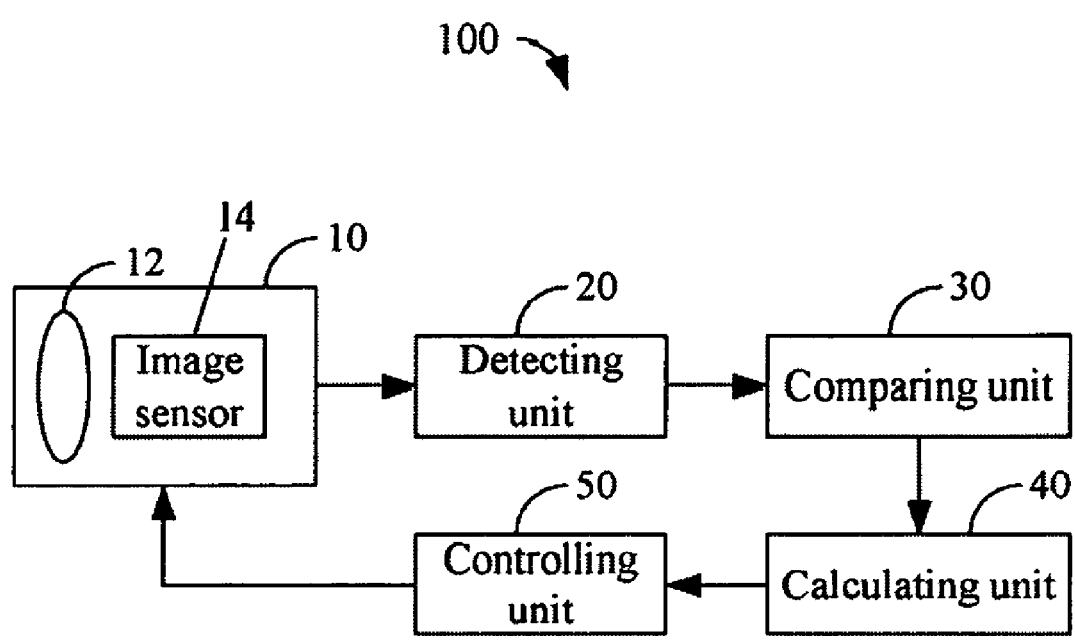
FIG. 1 is functional block diagram of a surveillance system, according to an exemplary embodiment.

Referring to FIG. 1, a surveillance system 100, according to an exemplary embodiment, includes a video capturing unit 10, a detecting unit 20, a comparing unit 30, a calculating unit 40, and a controlling unit 50. The video capturing unit 10 is configured for capturing video of an area. The video includes a number of consecutive images. The detecting unit 20 is configured for subdividing each image into a number of subdivisions and calculating a contrast value for each subdivision to produce a contrast value matrix associated with the corresponding image. The comparing unit 30 is configured for comparing each element of the contrast value matrix associated with a current image with a corresponding element of the contrast value matrix associated with a prior image and thereby determining a comparing value matrix associated with the current image. An element of the comparing value matrix is valued as '0' if the difference between two corresponding compared elements is smaller than a predetermined threshold or otherwise is valued as '1'. The calculating unit 40 is configured for weighting the comparing value matrix associated with the current image using a preset weight value matrix to determine where a moving object is located in the current image. The controlling unit 50 is configured for adjusting the aim of the video capturing unit 10, based upon the determination of the calculating unit 40, so that the moving object is included in a subsequent image (see below).

The video capturing unit 10 includes a lens 12 and an image sensor 14. The image sensor 14 can be a charge-coupled device (CCD) or a complementary metal oxide semiconductor (CMOS).

Figure 2:
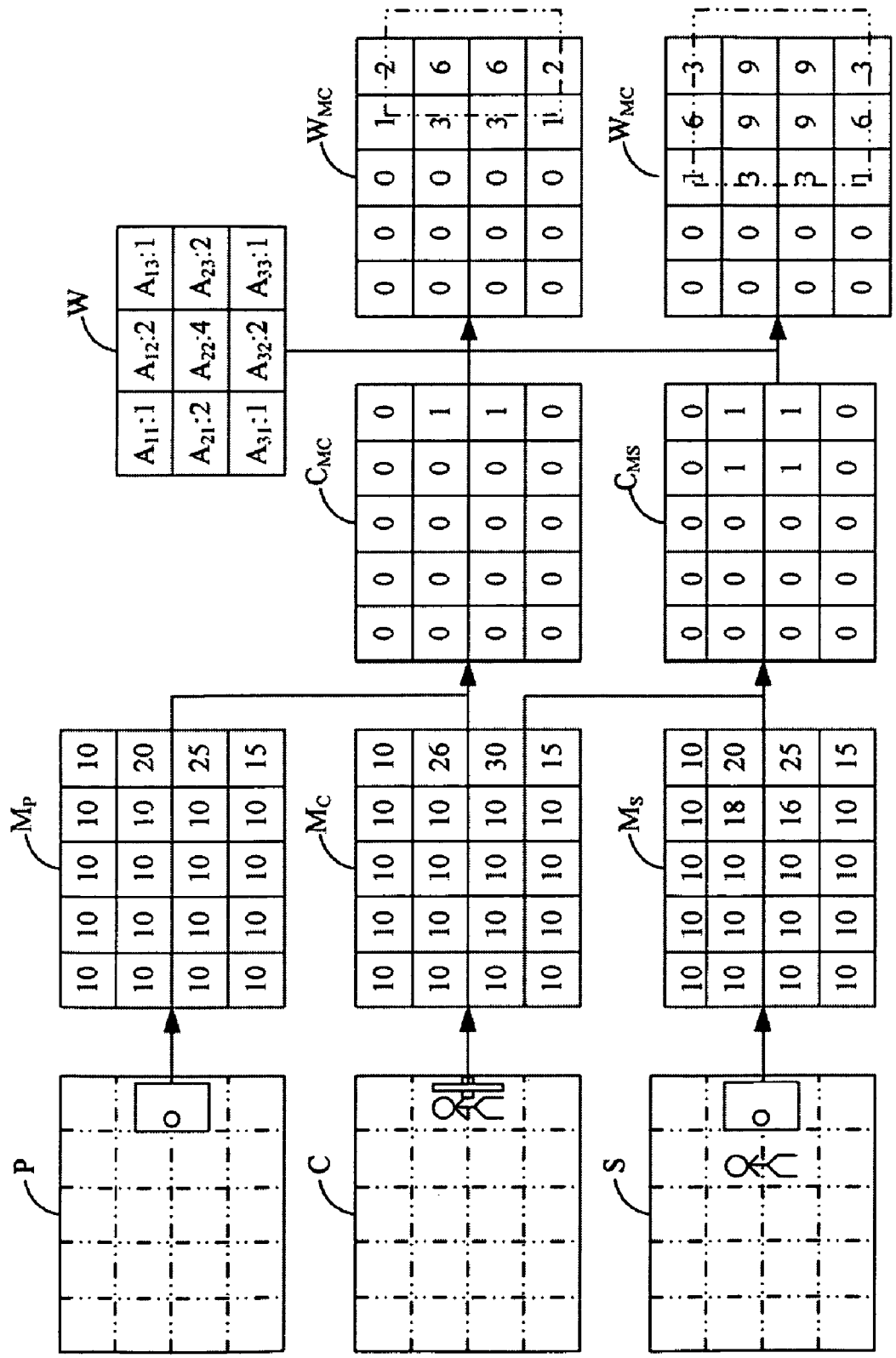
FIG. 2 is a schematic view showing the working principle of the surveillance system of FIG. 1.

Referring to FIG. 2, in this embodiment, the surveillance system 100 is considered to be configured to surveil an interior entrance area of a building. Accordingly, the video capturing unit 10 is initially aimed to capture video of a doorway of the entrance area. Exemplarily, the video includes three images P, C, S.

In the embodiment, the detecting unit 20 subdivides each image into 4×5 subdivisions. Further, the detecting unit 20 counts the number of pixels whose values are greater than a preset value for each subdivision, and calculates the ratio of the total pixel number to the counted number for each subdivision. The calculated ratios of the subdivisions constitute the contrast value matrix associated with the corresponding image. In this embodiment, corresponding to the images P, C, S, three contrast value matrices $M_P$, $M_C$, $M_S$ are produced by the detecting unit 20.

The predetermined threshold used by the comparing unit 30 in this embodiment is 0.05 m, where m is the value of the element of the contrast value matrix associated with the prior image. Corresponding to the three contrast value matrices $M_P$, $M_C$, $M_S$, in this embodiment, two comparing value matrices $C_{MC}$ (taking P as the prior image and C as the current image), $C_{MS}$ (taking C as the prior image and S as the current image) are calculated by the comparing unit 30. In principle, each element of the comparing value matrix can describe whether the contrast change of the corresponding subdivision between the current image and the prior image is acceptable. If yes, it is deemed that no moving object enters into the corresponding subdivision and is labeled as '0'. If no, it is deemed that the corresponding subdivision is entered by the moving object and is labeled as '1'.

The weight value matrix used in this embodiment is W. The calculating unit 40 weights a comparing value matrix C according to the following formula:

$$R_{mn} = B_{(m-1)(n-1)} \times A_{11} + B_{(m-1)n} \times A_{12} + B_{(m-1)(n+1)} \times A_{13} + B_{m(n-1)} \times A_{21} + B_{mn} \times A_{22} + B_{m(n+1)} \times A_{23} + B_{(m+1)(n-1)} \times A_{31} + B_{(m+1)n} \times A_{32} + B_{(m+1)(n+1)} \times A_{33}$$

Where, m=1, 2, 3, 4, n=1, 2, 3, 4, 5, $R_{mn}$ is an element of a weighted matrix at the intersection of m line and n row, Bmn is an element of the comparing value matrix at the intersection of m line and n row. In this embodiment, corresponding to the comparing value matrices $C_{MS}$, $C_{MS}$, two weighted comparing value matrices $W_{MS}$, $W_{MC}$ are calculated by the calculating unit 40.

In principle, the weight value matrix is an edge detecting operator. Therefore, as shown in FIG. 2, after weighting, the calculating unit 40 can recognize where the moving object is located (marked by the dashed line frame). Thereby the controlling unit 50 can adjust the aim of the lens 12 to always include the moving object therein, based upon the recognition of the calculating unit 40.

Figure 3:
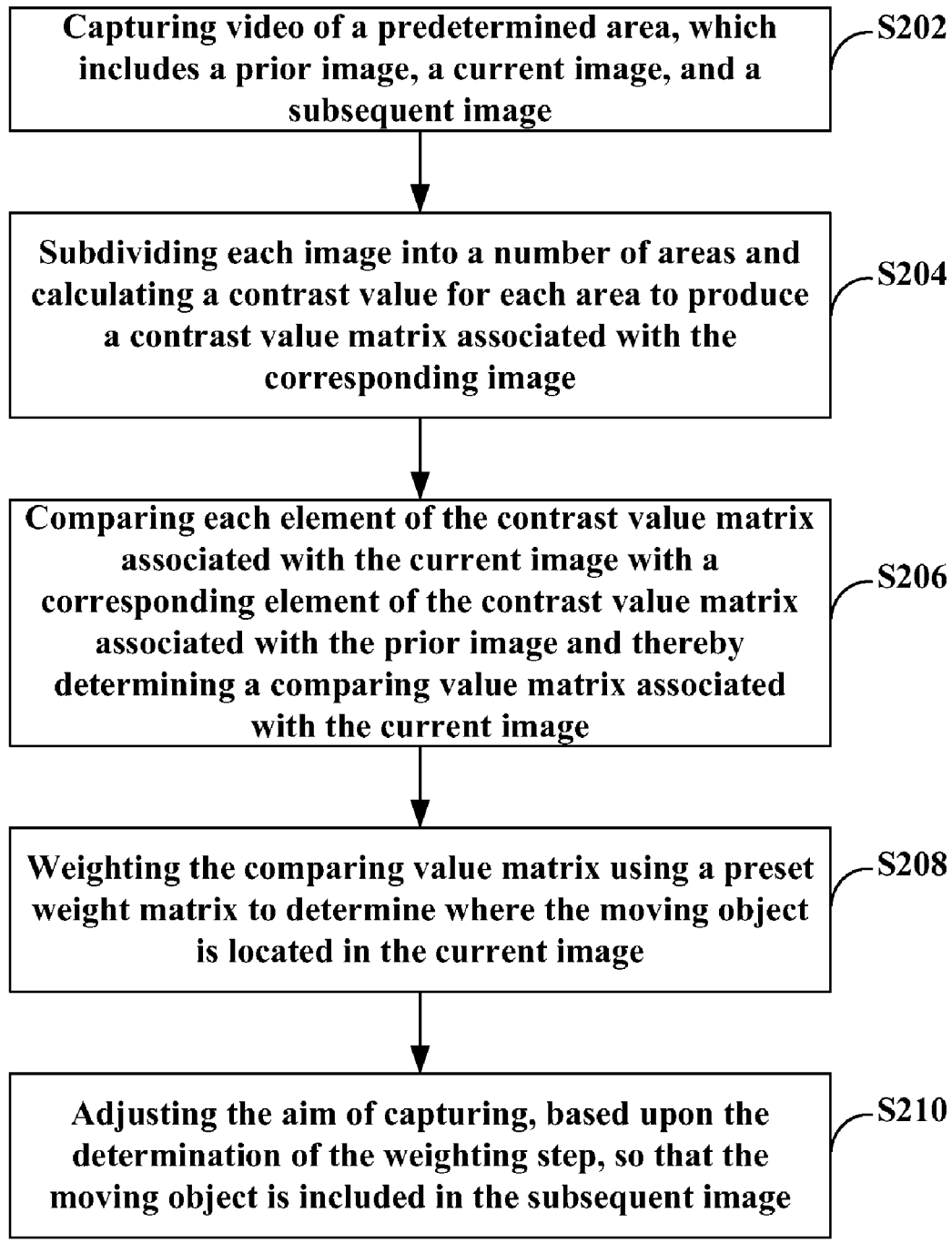
FIG. 3 is flowchart of a surveillance method, according to another exemplary embodiment.

Referring to FIG. 3, a surveillance method, according to another exemplary embodiment, can be exemplarily implemented by the surveillance system 100 and includes the following steps S202-210.

S202: capturing video of an area. The video includes a number of consecutive images, e.g., a prior image, a current image, and a subsequent image. This step can be carried out by the video capturing unit 10.

S204: subdividing each image into a number of subdivisions and calculating a contrast value for each subdivision to produce a contrast value matrix associated with the corresponding image. This step can be carried out by the detecting unit 20.

S206: comparing each element of the contrast value matrix associated with the current image with a corresponding element of the contrast value matrix associated with the prior image and thereby determining a comparing value matrix associated with the current image. This step can be carried out by the comparing unit 30.

S208: weighting the comparing value matrix using a preset weight value matrix to determine where a moving object is located in the current image. This step can be carried out by the calculating unit 40.

S210: adjusting the aim of the video capturing unit 10 to keep the moving object included in the subsequent image, based upon the determination of the weighting step. This step can be carried out by the controlling unit 50.

While the disclosure has been described by way of example and in terms of preferred embodiment, it is to be understood that the disclosure is not limited thereto. To the contrary, it is intended to cover various modifications and similar arrangements, which would be apparent to those skilled in the art. Therefore, the scope of the appended claims should be accorded the broadest interpretation so as to encompass all such modifications and similar arrangements.

It is also to be understood that above description and any claims drawn to a method may include some indication in reference to certain steps. However, the indication used is only to be viewed for identification purposes and not as a suggestion as to an order for the steps.

What is claimed is:

1. A surveillance system comprising:
   a video capturing unit capable of capturing video of an area, the video comprises a prior image and a current image;
   a detecting unit configured for subdividing each of the prior and current images into a plurality of subdivisions and calculating a contrast value for each subdivision to produce a contrast value matrix associated with each of the prior and current images;
   a comparing unit configured for comparing each element of the contrast value matrix associated with the current image with a corresponding element of the contrast value matrix associated with the prior image and determining a compared value matrix associated with the current image;
   a calculating unit configured for weighting the compared value matrix using a preset weight value matrix to determine a location of a moving object in the current image; and
   a controlling unit configured for adjusting the aim of the video capturing unit to keep the moving object included in a subsequent image of the video based upon the determination of the calculating unit;
   wherein the detecting unit counts the number of pixels whose values are greater than a predetermined value for each subdivision, and calculates the ratio of the total number of pixels to the counted number for each subdivision, the calculated ratios are the contrast values of the subdivisions.

2. The surveillance system as claimed in claim 1, wherein the video capturing unit comprises a lens and an image sensor.

3. The surveillance system as claimed in claim 2, where in the image sensor is selected from the group consisting of a charge-coupled device and a complementary metal oxide semiconductor.

4. The surveillance system as claimed in claim 1, wherein an element of the comparing value matrix is valued as '0' if the difference between two corresponding compared elements is smaller than a predetermined threshold and otherwise is valued as '1'.

5. The surveillance system as claimed in claim 1, wherein the preset weight value matrix is:

$$\begin{Bmatrix} A_{11}:1 & A_{12}:2 & A_{13}:1 \\ A_{21}:2 & A_{22}:4 & A_{23}:2 \\ A_{31}:1 & A_{32}:2 & A_{33}:1 \end{Bmatrix},$$

the calculating unit weighting a comparing value matrix C according to the following formula:

$$R_{mn} = B_{(m-1)(n-1)} \times A_{11} + B_{(m-1)n} \times A_{12} + B_{(m-1)(n+1)} \times A_{13} + B_{m(n-1)} \times A_{21} + B_{mn} \times A_{22} + B_{m(n+1)} \times A_{23} + B_{(m+1)(n-1)} \times A_{31} + B_{(m+1)n} \times A_{32} + B_{(m+1)(n+1)} \times A_{33},$$

where m and n are natural numbers, $R_{mn}$ is an element of a weighted matrix at the intersection of m line and n row, Bmn is an element of the comparing value matrix at the intersection of m line and n row.

6. A surveillance method comprising:
   capturing video of an area, the video comprises a prior image and a current image;
   subdividing each of the prior and current images into a plurality of subdivisions and calculating a contrast value for each subdivision;
   producing a contrast value matrix for each of the prior and current images;
   comparing each element of the contrast value matrix of the current image with a corresponding element of the contrast value matrix of the prior image and thereby determining a compared value matrix associated with the current image;
   weighting the compared value matrix using a preset weight matrix to determine where a moving object is located in the current image; and
   adjusting the aim of the capturing to include the moving object in a subsequent image of the video based upon the determination in the weighting step;
   wherein the number of pixels whose values are greater than a predetermined value for each subdivision is counted, and the ratio of the total number of pixels to the counted number for each subdivision is calculated, and the calculated ratio is the contrast value for each subdivision.

7. A surveillance method comprising:
   providing a surveillance system comprising:
      a video capturing unit capable of capturing video of an area, the video comprises a prior image and a current image;
      a detecting unit configured for subdividing each of the prior and current images into a plurality of subdivisions and calculating a contrast value for each subdivision to produce a contrast value matrix associated with each of the prior and current images;
      a comparing unit configured for comparing each element of the contrast value matrix associated with the current image with a corresponding element of the contrast value matrix associated with the prior image and determining a compared value matrix associated with the current image;
      a calculating unit configured for weighting the compared value matrix using a preset weight value matrix to determine a location of a moving object in the current image; and
      a controlling unit configured for adjusting the aim of the video capturing unit to keep the moving object included in a subsequent image of the video based upon the determination of the calculating unit;
   capturing the video of the area using the video capturing unit;
   subdividing each image into a plurality of subdivisions and calculating the contrast value for each subdivision using the detecting unit;
   producing the contrast value matrix for each of the prior and current image using the detecting unit;
   comparing each element of the contrast value matrix of the current image with a corresponding element of the contrast value matrix of the prior image and thereby determining the compared value matrix associated with the current image;

weighting the compared value matrix using the preset weight matrix to determine where the moving object is located in the current image using the calculating unit; and adjusting the aim of the capturing to include the moving object in the subsequent image of the video based upon the determination of the calculating unit using the controlling unit;

wherein the number of pixels whose values are greater than a predetermined value for each subdivision is counted, and the ratio of the total number of pixels to the counted number for each subdivision is calculated, and the calculated ratio is the contrast value for each subdivision.

\* \* \* \* \*